US007910686B2

(12) United States Patent
Shinoda et al.

(10) Patent No.: US 7,910,686 B2
(45) Date of Patent: Mar. 22, 2011

(54) BLOCK COPOLYMER AND APPLICATION THEREOF

(75) Inventors: Hiroshi Shinoda, Tsukuba (JP); Atsushi Terahara, Hioki-gun (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1302 days.

(21) Appl. No.: 10/531,265

(22) PCT Filed: Oct. 14, 2003

(86) PCT No.: PCT/JP03/13100
§ 371 (c)(1),
(2), (4) Date: Mar. 29, 2006

(87) PCT Pub. No.: WO2004/035662
PCT Pub. Date: Apr. 29, 2004

(65) Prior Publication Data
US 2006/0182678 A1    Aug. 17, 2006

(30) Foreign Application Priority Data

Oct. 15, 2002    (JP) .................................. 2002-300084

(51) Int. Cl.
*C08G 73/24*    (2006.01)
(52) U.S. Cl. .......... 528/401; 528/86; 528/391; 525/534; 525/535
(58) Field of Classification Search ............. 528/86, 528/401, 391; 525/534, 535
See application file for complete search history.

(56) References Cited

U.S. PATENT DOCUMENTS

| 5,834,566 | A | 11/1998 | Helmer-Metzmann et al. |
| 5,985,477 | A | 11/1999 | Iwasaki et al. |
| 6,087,031 | A | 7/2000 | Iwasaki et al. |
| 6,451,921 | B2 | 9/2002 | Weisse et al. |
| 6,761,989 | B2 | 7/2004 | Terahara et al. |
| 2001/0021764 | A1 | 9/2001 | Weisse et al. |
| 2001/0041279 | A1 | 11/2001 | Terahara et al. |
| 2002/0188097 | A1 | 12/2002 | Goto et al. |
| 2004/0220354 | A1 | 11/2004 | Terahara et al. |

FOREIGN PATENT DOCUMENTS

| EP | 1091435 A1 | 4/2001 |
| EP | 1126537 A1 | 8/2001 |
| JP | 10-21943 A | 1/1998 |
| JP | 10-45913 A | 2/1998 |
| JP | 11-502249 A | 2/1999 |
| JP | 2001-250567 A | 9/2001 |
| JP | 2001-278978 A | 10/2001 |
| JP | 2002-260687 A | 9/2002 |
| JP | 2002-289222 A | 10/2002 |

OTHER PUBLICATIONS

Miyatake et al. "Synthesis and Properties of Novel Sulfonated Arylene Ether/Fluorinated Alkane Copolymers", Macromolecules, 34, 2065-2071 (2001).*
K. Miyatake et al., "Synthesis and Properties of Novel Sulfonated Arylene Ether/Fluorinated Alkane Copolymers", Macromolecules 2001, 34, pp. 2065-2071.

* cited by examiner

*Primary Examiner* — Ling-Siu Choi
(74) *Attorney, Agent, or Firm* — Sughrue Mion, PLLC

(57) ABSTRACT

The present invention relates to a block copolymer having at least one block having an acid group and at least one block having substantially no acid group, wherein one end group of a repeating unit in at least one block of all blocks is oxygen and/or sulfur, and at least one repeating unit of a block having substantially no acid group contains a halogen atom. The block copolymer of the present invention gives a polymer electrolyte membrane which is excellent not only in heat resistance and proton conductivity but also in water resistance and chemical stability, and is useful as an electrolyte for a proton conducting membrane etc. of a fuel cell.

9 Claims, No Drawings

BLOCK COPOLYMER AND APPLICATION THEREOF

TECHNICAL FIELD

The present invention relates to a block copolymer, inter alia, a block copolymer which is suitably used as a polymer electrolyte in a fuel cell.

BACKGROUND ART

As a proton-conducting polymer electrolyte used in a solid polymer-type fuel cell, a perfluoroalkylsulfonic acid-based polymer electrolyte including Nafion (registered trademark of DuPont) has been mainly used since it is excellent in properties when used in a fuel cell. However, this electrolyte has a problem that a strength and heat resistance of a membrane thereof are low.

On the other hand, as a polymer electrolyte providing a membrane which is excellent in heat resistance and has a high membrane strength, for example, study of sulfonated polyether ketone (JP-A No. 11-502249) and sulfonated polyether sulfone (JP-A No. 10-45913 and JP-A No. 10-21943) in which a sulfonic acid group is introduced into aromatic polyether has been progressed. In these polymers, generally, as an introduced amount of a sulfonic acid group is larger, proton-conductivity grows higher, but at the same time, there is a possibility that water uptake of a polymer becomes high. And, a membrane made from a polymer having high water uptake has a problem that, when used in a fuel cell, a great dimensional change is caused by water produced during use of the fuel cell, and a strength thereof is reduced.

As a polymer for solving this problem, a block copolymer having one or more blocks in which a sulfonic acid group is introduced, and one or more blocks in which a sulfonic acid is not substantially introduced, and in which at least one block of all blocks has an aromatic ring on its main chain has been already proposed (JP-A No. 2001.250567).

SUMMARY OF THE INVENTION

The present inventors continued to study a block copolymer and, as a result, found out that a block copolymer in which a block having substantially no acid group is a block comprising a particular repeating unit containing a halogen atom is further excellent in water resistance, and is useful as a polymer electrolyte, inter alia, as a proton-conducting membrane of a fuel cell, leading to the present invention.

That is, the present invention provides a practically excellent block copolymer having at least one block having an acid group and at least one block having substantially no acid group, in which one end group of a repeating unit of at least one block in all blocks is oxygen and/or sulfur, and at least one repeating unit of a block in which an acid group is not substantially introduced contains a halogen atom, and use thereof.

PREFERABLE MODE FOR CARRYING OUT THE INVENTION

The present invention will be explained in detail below.
In the present invention, a block copolymer refers to a polymer in which two or more blocks are bound directly or via a linking group, that is, a polymer in which a plurality of two or more kinds of blocks having different repeating structures are incorporated.

The copolymer of the present invention has at least one block having an acid group and at least one block having substantially no acid group, and a block having an acid group is preferably a block in which the average number of acid groups are bound per one repeating unit constituting the block is 0.5 or more. On the other hand, a block having substantially no acid group is preferably a block in which the average number of an acid group per one repeating unit constituting the block is 0.1 or less.

One end group of a repeating unit of at least one block of all blocks is oxygen and/or sulfur, and the repeating units are bound via, for example, oxygen of carbon-oxygen bond, or sulfur of carbon-sulfur bond.

The copolymer of the present invention is characterized in that a repeating unit of a block having substantially no acid group contains a halogen atom.

Examples of a halogen atom include fluorine, chlorine and bromine and, inter alia, fluorine is preferable.

Herein, a halogen atom may directly substitute at a main chain of a repeating unit, or may be contained on a side chain. Examples of a block in which a halogen atom directly substitutes at a main chain include a polymer such as polyethers, polysulfides, polyphenylenes, polyketones and polysulfones, and poly(halogenated alkylenes) containing, as a main chain, a group in which a halogen atom directly substitutes thereto such as a halogenated arylene group of a carbon number of 6 to 18, a halogenated aryleneoxy group of a carbon number of 6 to 18, a halogenated alkylene group of a carbon number of 1 to 10, and a halogenated alkylenedioxy group of a carbon number of 1 to 10.

Examples of a halogenated arylene group of a carbon number of 6 to 18 include a tetrafluorophenylene group, and an octafluorobiphenylilene group.

Examples of a halogenated aryleneoxy group of a carbon number of 6 to 18 include a tetrafluorophenylenedioxy group, and an octafluorobiphenylilenedioxy group.

Examples of a halogenated alkylene group of a carbon number of 1 to 10 include a difluoromethylene group, a tetrafluoroethylene group, an octafluorotetramethylene group, a 1,1,2-trifluoro-2-chloroethylene group, a 2,2,3,3,4,4-hexafluoropentamethylene group, and a 2,2,3,3,4,4,5,5,6,6-decafluoroheptamethylene group.

Examples of a halogenated alkylenedioxy group of a carbon number of 1 to 10 include a tetrafluoroethylenedioxy group, an octafluorotetramethylene-1,4-dioxy group, a 2,2,3,3,4,4-hexafluoropentamethylenedioxy group, and a 2,2,3,3,4,4,5,5,6,6-decafluoroheptamethylenedioxy group.

Examples of a block containing a halogen atom on a side chain include a polymer of polyethers, polysulfides, polyphenylenes, polyketones, and polysulfones containing, on a side chain, a group substituted with a halogen atom such as a halogenated alkyl group of a carbon number of 1 to 10, and a halogenated aryl group.

Examples of a halogenated alkyl group of a carbon number of 1 to 10 include a trifluoromethyl group, and a pentafluoroethyl group. A representative example of a halogenated aryl group includes a pentafluorophenyl group.

It is more preferable that a block having substantially no acid group is a polymer in which a repeating unit is represented by the general formula [1].

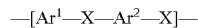

—[Ar¹—X—Ar²—X]—  [1]

wherein X represents an oxygen atom or a sulfur atom, and Ar¹ and Ar² represent independently an aromatic group represented by the following formula [2], [3] or [4]:

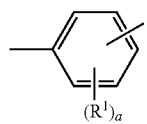

[2]

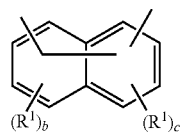

[3]

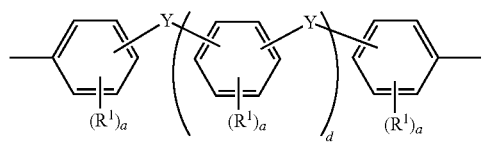

[4]

R¹ represents an alkyl group of a carbon number of 1 to 10, a halogenated alkyl group of a carbon number of 1 to 10, a halogenated aryl group, a hydroxyl group, an acetyl group, a benzoyl group, a nitrile group, a nitro group or a halogen atom. When there are plural (R¹)s, they may be the same as or different from each other, and (R¹)s may be bound together so that the bond is a part of a cyclic structure. And, a, b and c represent independently an integer of 0 to 4, a sum of b and c is 0 to 6, and d represents an integer of 0 to 2. Y represents a direct bond, —O—, —S—, —C(O)—, —SO₂—, —C(R²)₂—, an alkylene group of a carbon number of 1 to 6, a halogenated alkylene group of a carbon number of 1 to 10, an alkylenedioxy group of a carbon number of 1 to 6, or an halogenated alkylenedioxy group of a carbon number of 1 to 10. When there are a plural of (Y)s, they may be the same or different. Any one of R¹ and Y (when there are a plural of each R¹ and Y, at least one of them) contains a halogen atom. (R)²s represents a hydrogen atom, an alkyl group of a carbon number of 1 to 10 or a halogenated alkyl group of a carbon number of 1 to 10, and two (R²)s may be the same or different from each other, or (R²)s may be bound together so that the bond is a part of a cyclic structure.

Herein, examples of an alkyl group of a carbon number of 1 to 10 in R¹ include a methyl group, an ethyl group and a propyl group. Examples of a halogenated alkyl group of a carbon number of 1 to 10 include a trifluoromethyl group, and a pentafluoroethyl group. Examples of a halogenated aryl group include a pentafluorophenyl group. Representative examples of a halogen atom include fluorine, chlorine and bromine. When R¹s are bound together so that the bond constitutes a part of a cyclic structure, examples of a part of a cyclic structure include a divalent structure such as ethylene, trimethylene, tetramethylene, butadienylene, ethylene-1,2-dioxy, and biphenyl-2,2'-diyl.

As R¹, a halogenated alkyl group, a halogenated aryl group, and a halogen are preferable and, among these, a trifluoromethyl group and a fluoro group are more preferable.

Examples of an alkylene group of a carbon number of 1 to 6 in Y include a methylene group and an ethylene group. Examples of a halogenated alkylene group of a carbon number of 1 to 10 include, in addition to a difluoromethylene group, a tetrafluoroethylene group, an octafluorobutylene group, and a 1,1,2-trifluoro-2-chloroethylene group, a partially halogenated alkylene group such as a 2,2,3,3,4,4-hexafluoropentamethylene group, and a 2,2,3,3,4,4,5,5,6,6-decafluoroheptamethylene group. Examples of an alkylenedioxy group of a carbon number of 1 to 6 include a methylenedioxy group, and an ethylenedioxy group. Examples of a halogenated alkylenedioxy group of a carbon number of 1 to 10 include, in addition to a tetrafluoroethylenedioxy group and an octafluorotetramethylenedioxy group, a partially halogenated alkylenedioxy group such as a 2,2,3,3,4,4-hexafluoropentamethylenedioxy group, and a 2,2,3,3,4,4,5,5,6,6-decafluoroheptamethylenedioxy group.

Examples of an alkyl group of a carbon number of 1 to 10 and a halogenated alkyl group of a carbon number of 1 to 10 in R² include the same groups as those described above. In addition, when two R²s are bound together so that the bond constitutes a part of a cyclic structure, examples of a cyclic structure include a cyclohexane ring, and a fluorene ring group.

As Y, a direct bond, —O—, —S—, —C(O)—, —SO₂—, —C(R²)₂—, a halogenated alkylene group of a carbon number of 1 to 10, and a halogenated alkylenedioxy group of a carbon number of 1 to 10 are preferable and, among these, —C(O)— and —SO₂— are more preferable.

As an example having a repeating unit represented by the general formula [1], for example, poly(arylene ether) or poly(arylene sulfide) having the following repeating unit structure is preferably used.

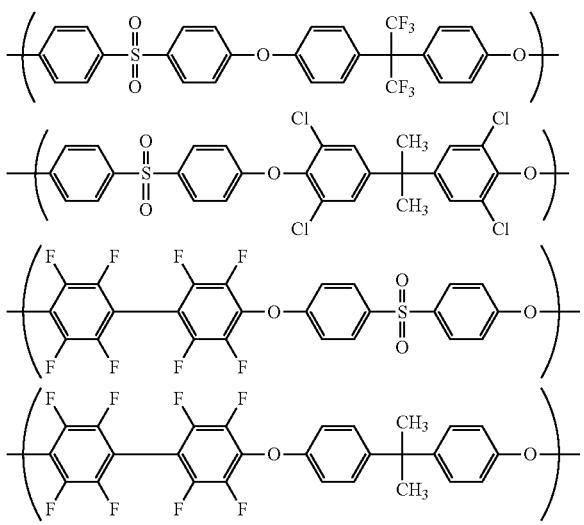

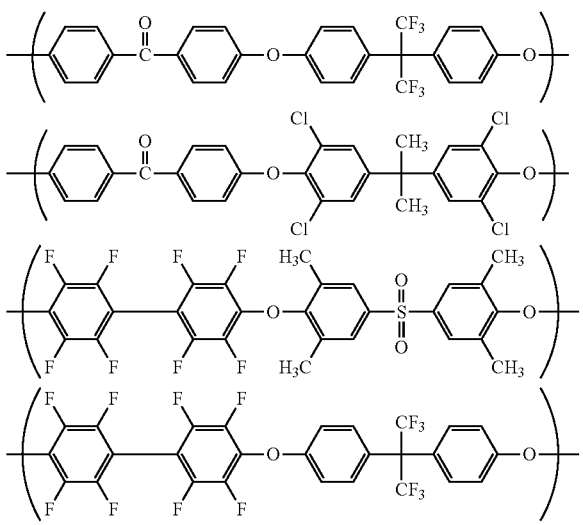

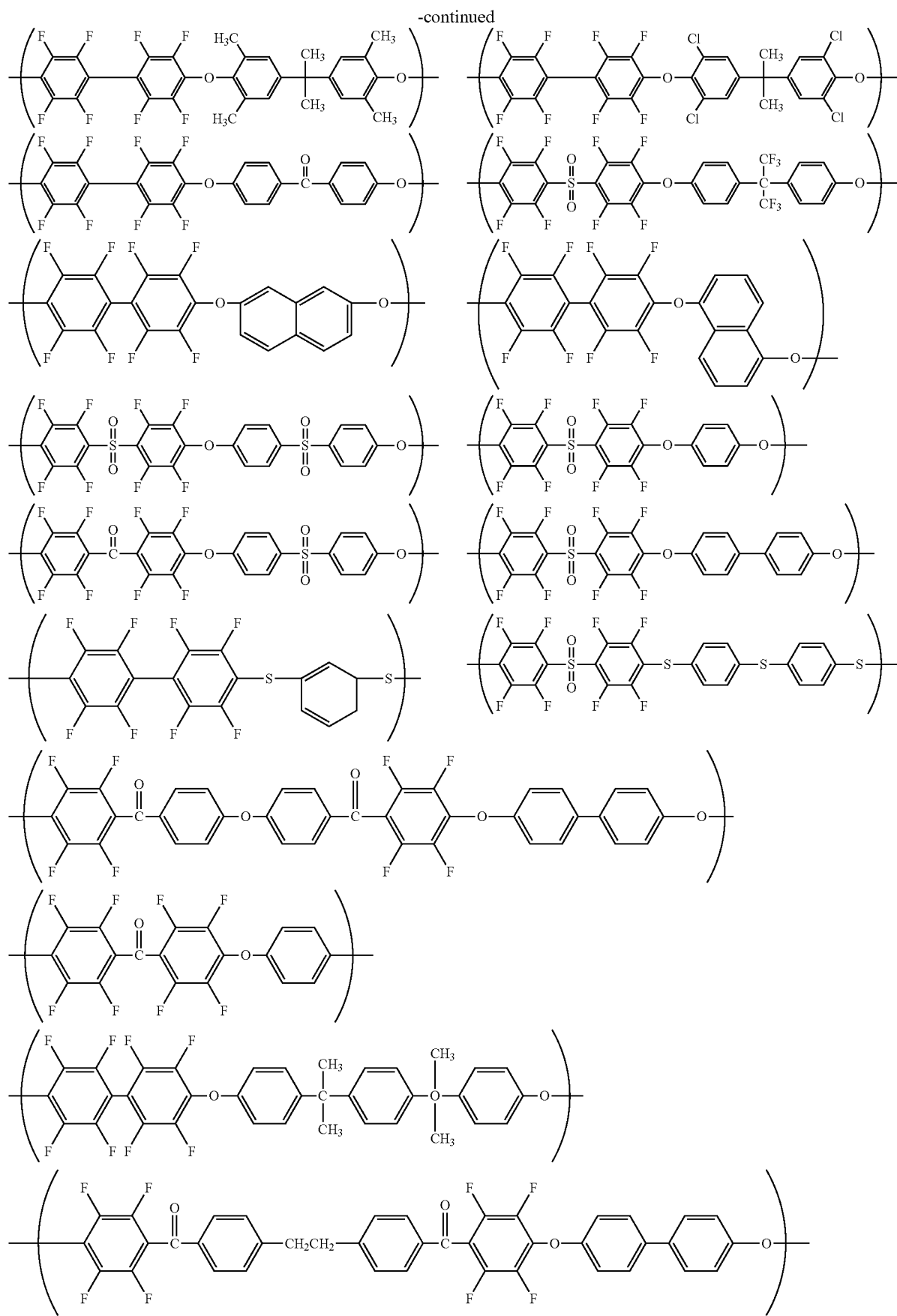

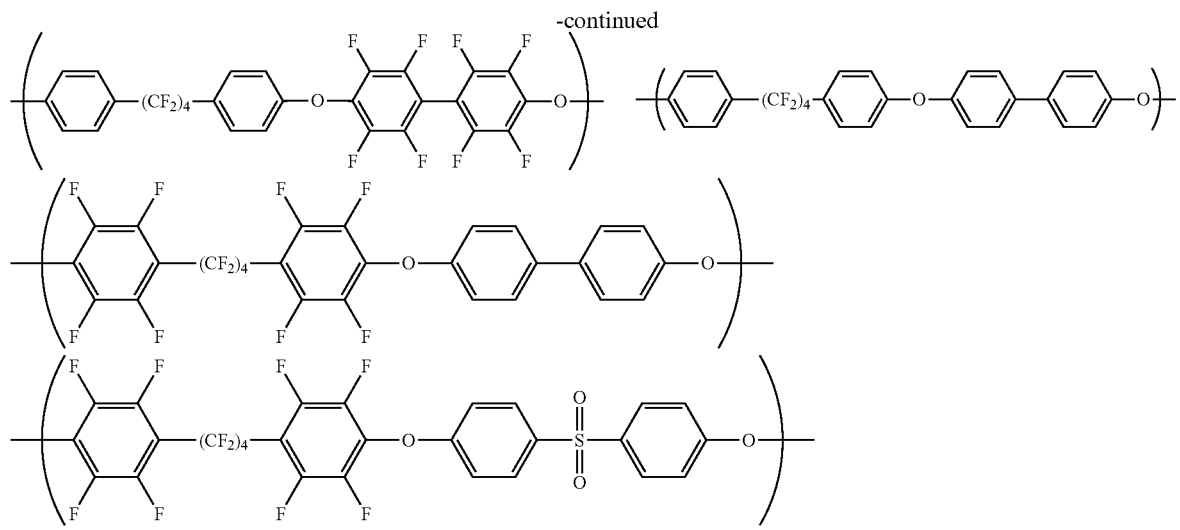

Among these, a repeating unit having the following structure is further preferable.

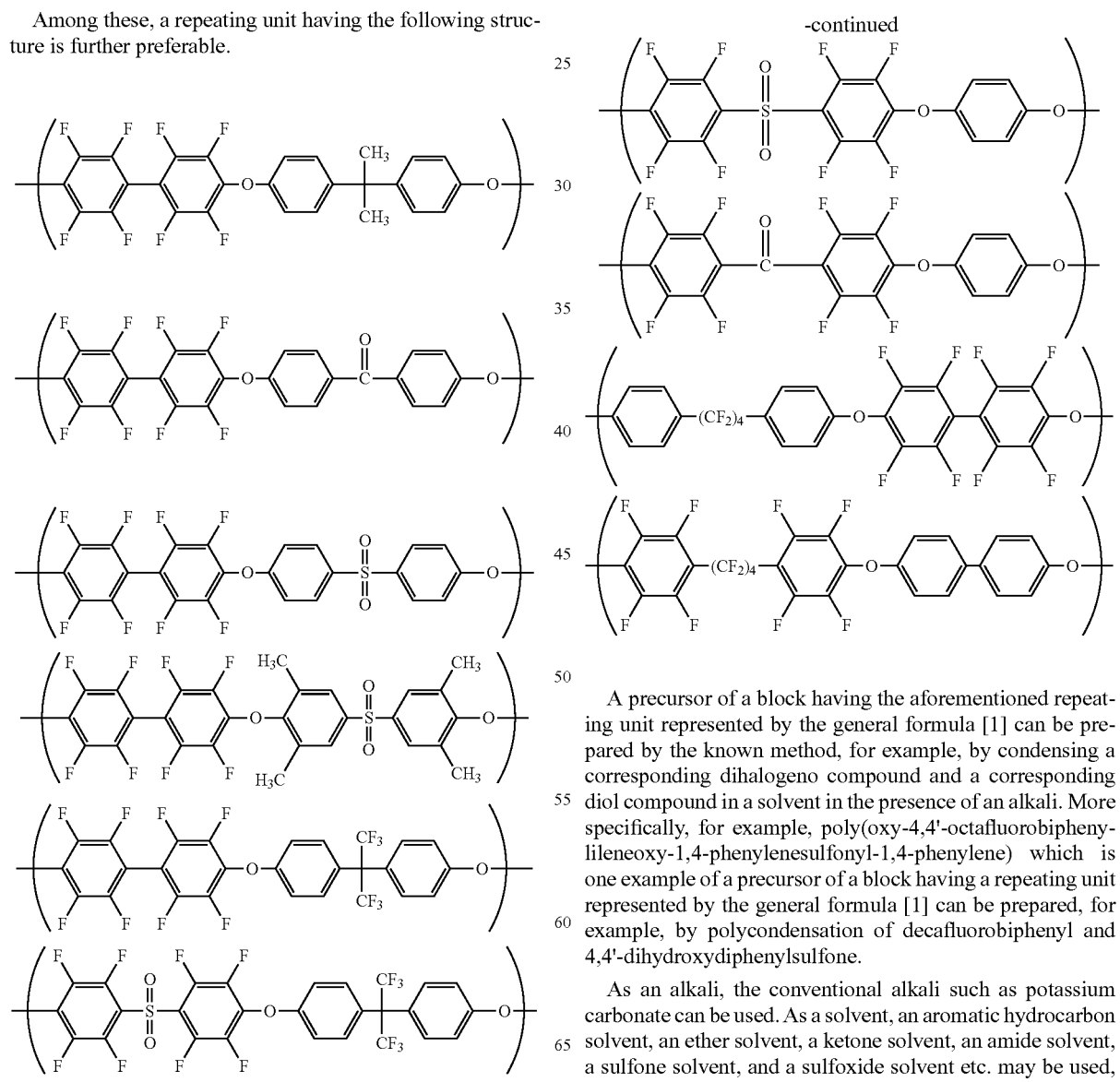

A precursor of a block having the aforementioned repeating unit represented by the general formula [1] can be prepared by the known method, for example, by condensing a corresponding dihalogeno compound and a corresponding diol compound in a solvent in the presence of an alkali. More specifically, for example, poly(oxy-4,4'-octafluorobiphenylileneoxy-1,4-phenylenesulfonyl-1,4-phenylene) which is one example of a precursor of a block having a repeating unit represented by the general formula [1] can be prepared, for example, by polycondensation of decafluorobiphenyl and 4,4'-dihydroxydiphenylsulfone.

As an alkali, the conventional alkali such as potassium carbonate can be used. As a solvent, an aromatic hydrocarbon solvent, an ether solvent, a ketone solvent, an amide solvent, a sulfone solvent, and a sulfoxide solvent etc. may be used, and dimethyl sulfoxide, sulfolane, N,N-dimethylformamide, N,N-dimethylacetamide, N-methylpyrrolidone, N,N'-dimethylimidazolidinone, and diphenylsulfone etc. are preferably used.

A reaction temperature of a polymerization reaction is usually 20° C. to 300° C., preferably 50° C. to 200° C.

A number average molecular weight of the block precursor is preferably 2000 to 500000, more preferably 5000 to 300000, further preferably 8000 to 100000. When a number average molecular weight is smaller than 2000, a membrane strength and heat resistance of a obtainable copolymer may be reduced in some cases. When a number average molecular weight is larger than 500000, solubility in a solvent used in a later block copolymerization step or a producing membrane step may be reduced in some cases.

The copolymer of the present invention is characterized in that a repeating unit in the aforementioned block, that is, a block having substantially no acid group contains a halogen atom. Examples of a block which is another block and has an acid group include blocks in which polystyrene, poly(α-methylstyrene), poly(arylene ether), poly(phenylglycidyl ether), poly(arylene sulfide), polyether ether ketone, polyethersulfone, polyether ether sulfone, polysulfone, poly(phenylmethylsiloxane), poly(diphenylsiloxane), poly(phenylmethylphosphazene), poly(diphenylphosphazene) or epoxy resin has an acid group such as a sulfonic acid group, a sulfonylimide group, a phosphonic acid group, or a carboxylic acid group.

It is preferable that an acid group is a sulfonic acid group or a sulonylimide group.

The average number of an acid group in a repeating unit of a block having an acid group is usually 0.5 or more, preferably 0.1 or more per the repeating unit. When the repeating unit has an aromatic ring, the case where a repeating unit has 0.5 or more of an acid group per an aromatic ring on average is preferable, and, the case where substantially all aromatic rings have at least one acid group is more preferable. Such the acid group may be directly bound, or via a linking group such as alkylene, oxyalkylene, phenylene and oxyphenylene, to an aromatic ring.

Among blocks having an acid group, a block having a repeating unit represented by the following general formula [5] and the aforementioned acid group, a block having a repeating unit represented by the following general formula [6] and the aforementioned acid group, a block having a repeating unit represented by the following general formula [7] and the aforementioned acid group, or a block having a unit represented by the following general formula [8] is preferable.

General formula [5]

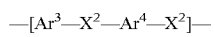　　[5]

wherein $X^2$ represents an oxygen atom or a sulfur atom, and $Ar^3$ and $Ar^4$ represent independently an aromatic group represented by the following formula [9], [10] or [11]:

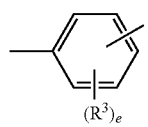　　[9]

-continued

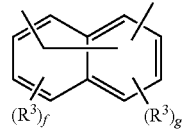　　[10]

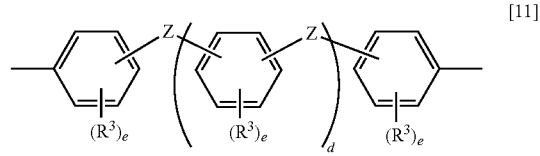　　[11]

$R^3$ represents an alkyl group of a carbon number of 1 to 6, an alkyloxy group of a carbon number of 1 to 6, a phenoxy group or a phenyl group. And, e represents an integer of 0 to 3, and d is as defined above. And, f and g represent an integer of 0 to 4, and a sum of f and g is 0 to 5. When there are plural $R^3$s, these may be the same or different, or $R^3$s may be bound together so that the bond may constitute a part of a cyclic structure. Z represents a direct bond, —O—, —S—, —C(O)—, —SO$_2$—, —C(R$^2$)$_2$—, —NR$^4$ —, an alkylene group of a carbon number of 1 to 20, a halogenated alkylene group of a carbon number of 1 to 10, an alkylenedioxy group of a carbon number of 1 to 20 or a halogenated alkylenedioxy group of a carbon number of 1 to 10. When there are plural Zs, these may be the same or different. $R^2$ is as defined above, and $R^4$ represents a hydrogen atom or an alkyl group of a carbon number of 1 to 6.

Herein, examples of an alkyl group of a carbon number of 1 to 6 in $R^3$ include a methyl group, an ethyl group, and a propyl group, and examples of an alkyloxy group of a carbon number of 1 to 6 include a methoxy group, and an ethoxy group.

Examples of an alkylene group of a carbon number of 1 to 20 in Z include a methylene group, an ethylene group, and a propylene group, and examples of a halogenated alkylene group of a carbon number of 1 to 10 include a difluoromethylene group, a tetrafluoroethylene group, and an octafluorobutylene group. Examples of an alkylenedioxy group of a carbon number of 1 to 20 include a methylenedioxy group, and an ethylenedioxy group, and examples of a halogenated alkylenedioxy group of a carbon number of 1 to 10 include a difluoromethylenedioxy group, a tetrafluoroethylenedioxy group, and an octafluorobutylenedioxy group. Examples of an alkyl group of a carbon number of 1 to 6 in $R^4$ include the same groups as those in $R^3$.

As an example having a repeating unit represented by the general formula [5], there are poly(arylene ethers), and poly(arylene sulfides). Among them, a repeating unit having the following structure is preferable.

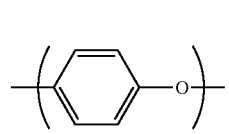 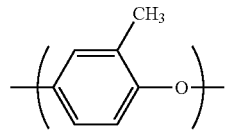

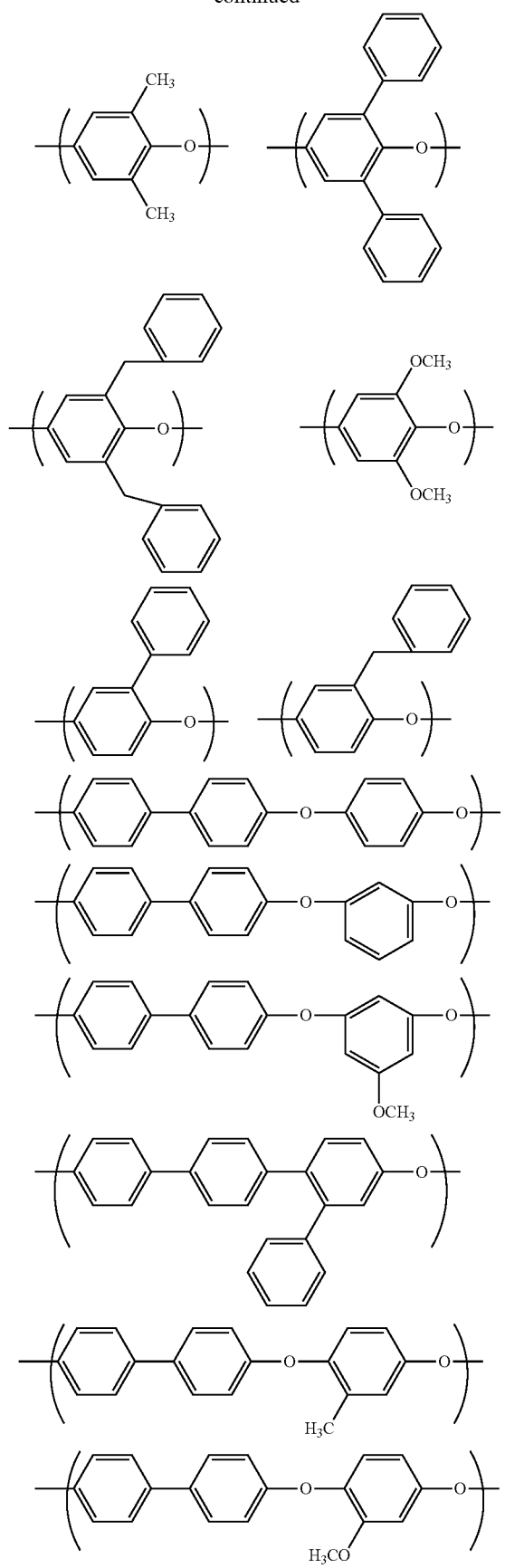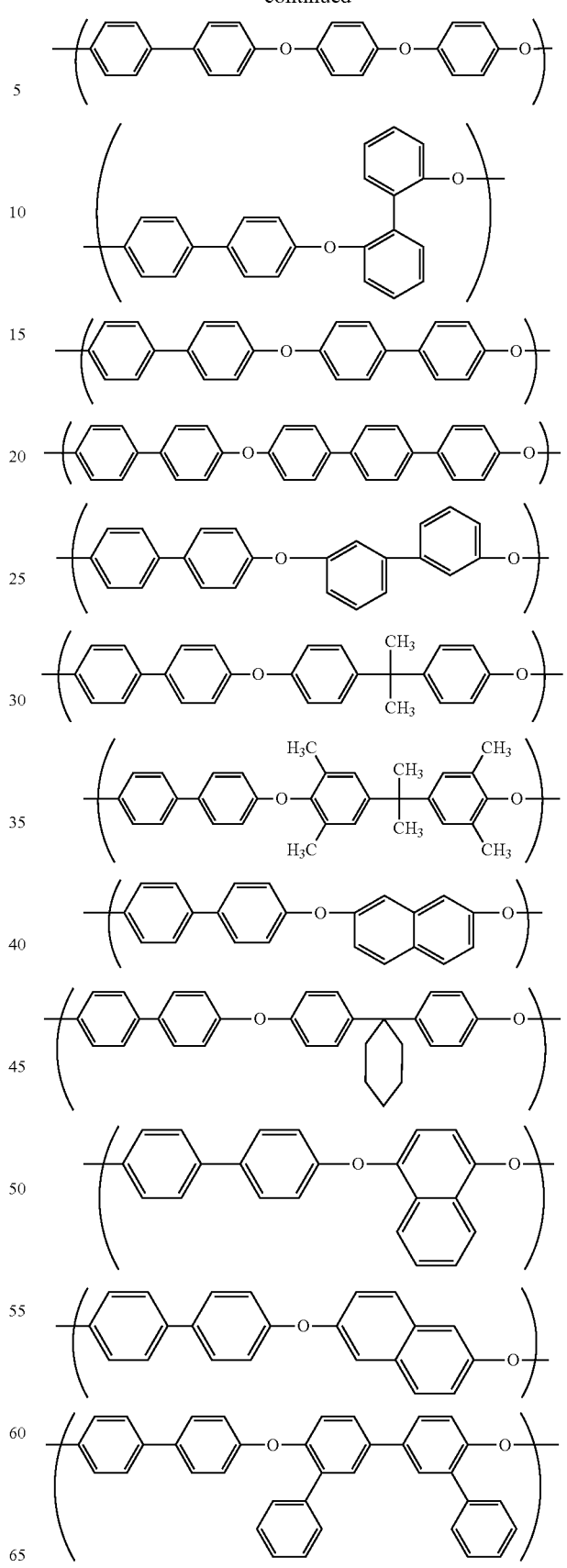

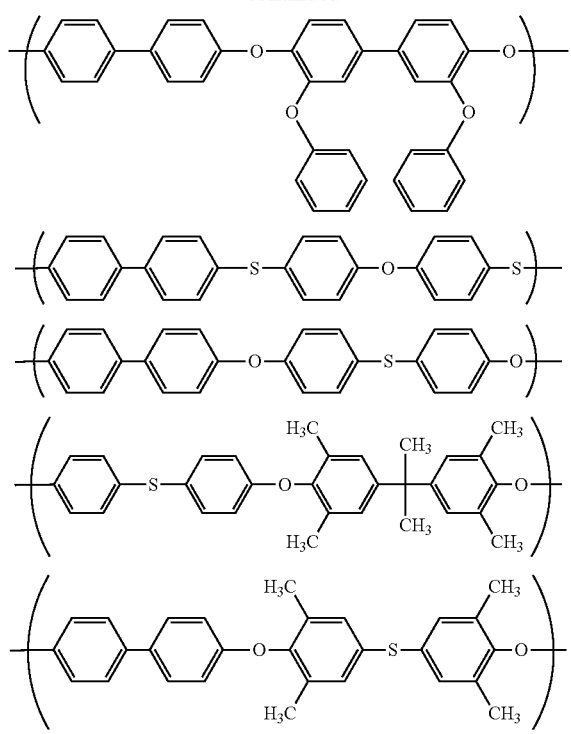
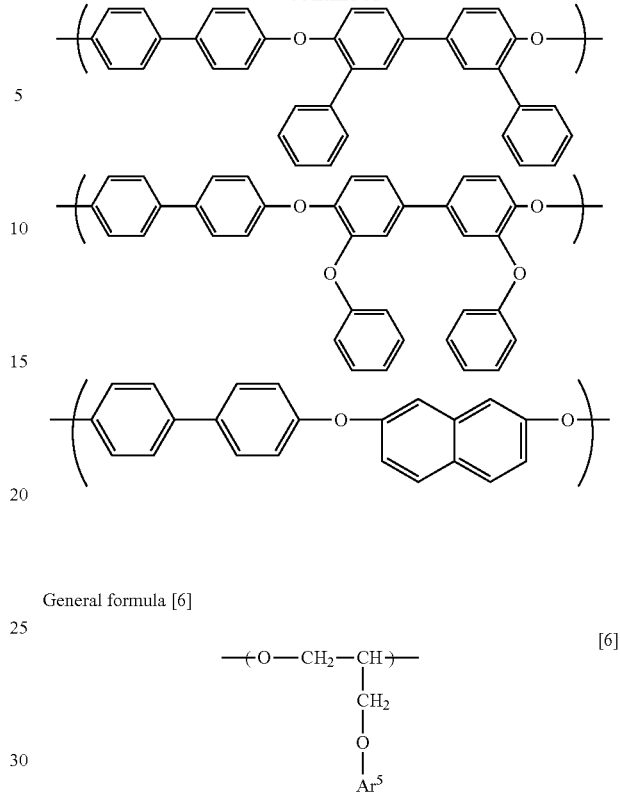

A repeating unit having the following structure is further preferable.

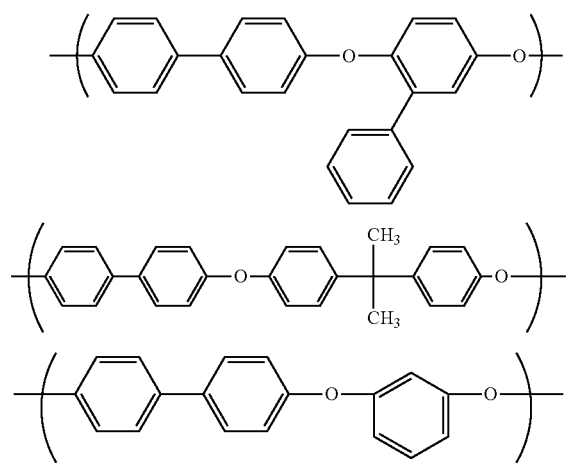

General formula [6]

$$-\!\!\left(\!O-CH_2-CH\right)\!-\!\!\!\underset{\underset{Ar^5}{\overset{\displaystyle|}{O}}}{\overset{\displaystyle|}{CH_2}}\quad[6]$$

wherein $Ar^5$ represents an aromatic group represented by the following formula [12] or [13]:

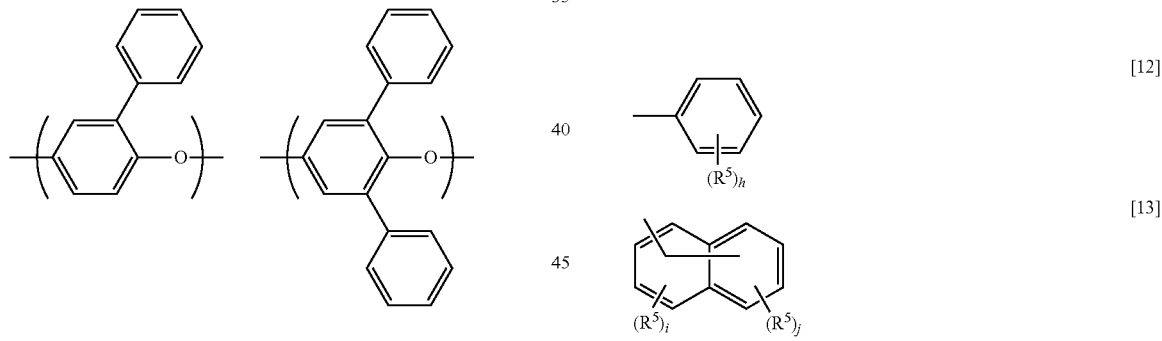

(wherein $R^5$ represents an alkyl group of a carbon number of 1 to 6, an alkyloxy group of a carbon number of 1 to 6, a phenoxy group or a phenyl group, h represents an integer of 0 to 4, i represents an integer of 0 to 3, j represents an integer of 0 to 4, a sum of i and j is an integer of 0 to 6 and, when there are plural $R^5$s, these may be the same or different, or $R^5$s may be bound together so that the bond constitutes a part of a cyclic structure).

Herein, examples of an alkyl group of a carbon number of 1 to 6 include a methyl group, an ethyl group, and a propyl group. Examples of an alkyloxy group of a carbon number of 1 to 6 include a methoxy group, and an ethoxy group.

Examples of $Ar^5$ include a phenyl group, an o-toluyl group, a m-toluyl group, a p-toluyl, a 2,3-dimethylphenyl group, a 2,4-dimethylphenyl group, a 2,5-dimethylphenyl group, a 2,6-dimethylphenyl group, a 2,3,4-trimethylphenyl group, a 2,4,6-trimethylphenyl group, a 2,4,5,6-tetramethylphenyl group, a 2-ethylphenylgroup, a 4-ethylphenylgroup, a 2-biphenylgroup, a 4-biphenyl group, a 1-naphthyl group, and a 2-naphthyl group.

General formula [7]

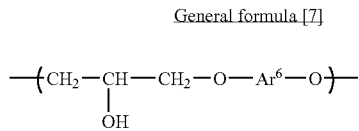

[7]

wherein $Ar^6$ represents an aromatic group represented by the following formula [14], [15] or [16]:

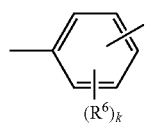

[14]

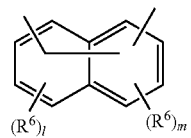

[15]

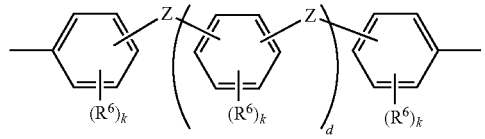

[16]

$R^6$ represents an alkyl group of a carbon number of 1 to 6, an alkyloxy group of a carbon number of 1 to 6, a phenoxy group or a phenyl group, k represents an integer of 0 to 3, 1 and m represent an integer of 0 to 4, a sum of 1 and m is 0 to 5 and, when there are plural $R^6$s, these may be the same or different, or $R^6$s may be bound to form a cyclic partial structure, and Z and d are as defined above.

Herein, examples of an alkyl group of a carbon number of 1 to 6 include a methyl group, an ethyl group, and a propyl group. Examples of an alkyloxy group of a carbon number of 1 to 6 include a methoxy group, an ethoxy group, and a phenoxy group.

Representative examples of $Ar^6$ include a m-phenylene group, a p-phenylene group, a 1,2-naphthylene group, a 1,4-naphthylene group, a 1,5-naphthylene group, a 2,6-naphthylene group, a 2,7-naphthylene group, a 4,4'-biphenylilene group, a 2,4'-biphenylilene group, an isopropylidenediphenylene group, and a hexafluoroisopropylidenediphenylene group.

General formula [8]

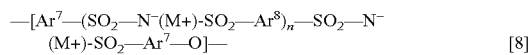

[8]

wherein $Ar^7$ and $Ar^8$ represent independently an aromatic group represented by the following formula [17], [18] or [19], n represents an integer of 0 to 3, and M+ represents an ion selected from a hydrogen ion, an alkali metal ion and ammonium:

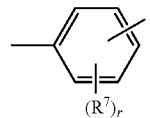

[17]

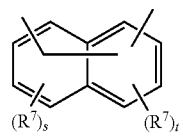

[18]

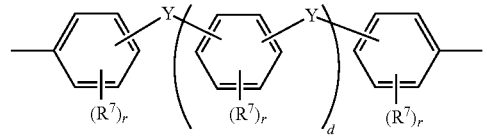

[19]

$R^7$ represents an alkyl group of a carbon number of 1 to 10, an aryl group of a carbon number of 6 to 12, an alkyloxy group of a carbon number of 1 to 10, an aryloxy group of a carbon number of 6 to 12, a hydroxyl group, an acetyl group, a benzoyl group, a nitrile group, a nitro group, a sulfonic acid group, a carboxylic acid group, a phosphonic acid group or a halogen atom, r, s and t represent an integer of 0 to 4, a sum of s and t is 0 to 6 and, when there are plural $R^7$s, these may be the same or different, or $R^7$s may be bound together so that the bond constitutes a part of a cyclic structure, and Y and d are as defined above.

Herein, examples of an alkyl group of a carbon number of 1 to 10 include a methyl group, an ethyl group, and a propyl group, and examples of an aryl group of a carbon number of 6 to 12 include a phenyl group, and a naphthyl group. Examples of an alkyloxy group of a carbon number of 1 to 10 include a methoxy group and an ethoxy group, and examples of an aryloxy group of a carbon number of 6 to 12 include a phenoxy group. Examples of a halogen atom include fluorine, chlorine and bromine.

An ion dissociation degree of M+varies depending on an adjacent aromatic group, and a substituent on $Ar^7$ or $Ar^8$, and as electron withdrawing property of a substituent is higher, an ion dissociation degree grows higher. Therefore, as $Ar^7$ and $Ar^8$, those substituted with a substituent having high electron withdrawing property, for example, those substituted with a halogen atom or a group having a halogen atom are preferable, and those substituted with a fluorine atom or a group having a fluorine atom are more preferable. Among these, when $Ar^7$ and $Ar^8$ are a tetrafluorophenylene group, this is particularly preferable since an ion dissociation degree of M+ is high.

Examples of M+ include a hydrogen ion, an alkali metal ion and an ammonium ion. When a polymer electrolyte is used in a fuel cell, M+ is preferably a hydrogen ion.

A precursor of a block having the aforementioned repeating unit represented by the general formula [5] can be prepared by the known method. For example, in the case of poly(phenylene ether), the precursor can be prepared by an oxidative polymerization method of oxidizing phenol in the presence of a catalyst, or a method called so-called Ullmann reaction of condensing halogenated phenol in the presence of a catalyst and an alkali. The precursor may be also prepared by a method of condensing a dihalogeno compound and a diol compound in the presence of an alkali (occasionally, in the presence of a catalyst).

A precursor of a block having a repeating unit represented by the general formula [6] is obtained, for example, according to the known method such as the method described in JP-A No. 2001-250567.

A precursor of a block having a repeating unit represented by the general formula [7] can be synthesized by the generally known synthesis method, and is obtained, for example, according to the method described in JP-A No. 2001-250567.

A block having a polymerization unit represented by the general formula [8] is synthesized, for example, by a method of polymerizing a compound represented by the following formula [21] and an aromatic diol represented by the formula [22].

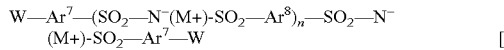  [21]

  [22]

(wherein $Ar^7$, $Ar^8$, n and M+ are as defined above, and $R^8$ represents an alkylene group of a carbon number of 1 to 10, a halogenated alkylene group of a carbon number of 1 to 10, or a divalent aromatic group, and W represents a halogen atom or a nitro group).

A compound represented by the above formula [21] can be prepared as follows:

A compound in which n is 0 can be easily prepared by reacting $W-Ar^7-SO_2Cl$ which is a corresponding sulfonyl chloride compound, and $W-Ar^7-SO_2NH_2$ which is a sulfonamide compound in the presence of a base.

A sulfonamide compound used herein can be prepared by reacting $W-Ar^7-SO_2Cl$ which is a corresponding sulfonyl chloride compound and ammonia or ammonium chloride in the presence of a base.

In addition, a compound in which n is 1 can be easily prepared by a reaction of $W-Ar^7-SO_2NH_2$ which is a sulfonamide compound and $ClSO_2-Ar^8-SO_2Cl$ which is a corresponding bissulfonyl chloride compound, or a reaction of $W-Ar^7-SO_2Cl$ which is a sulfonyl chloride compound and $NH_2SO_2-Ar^8-SO_2NH_2$ which is a corresponding bissulfonamide compound. The reaction is performed, for example, under the same condition as that in the case of n=0. A bissulfonamide compound used herein can be prepared by reacting a corresponding bissulfonyl chloride compound and ammonia or ammonium chloride.

A compound in which n is 2 or 3 can be prepared, for example, by reacting a bissulfonyl chloride compound and a bissulfonamide compound, and a sulfonyl chloride compound or a sulfonamide compound. However, purification at a stage of a compound [21] may be difficult in many cases, and it may be difficult to increase a molecular weight of a final polymer in some cases, therefore, it is preferable to use a compound [21] of n=0 or n=1.

Representative examples of a sulfonyl chloride compound used in preparing a compound [21] include 4-fluorobenzenesulfonyl chloride, 3-fluorobenzenesulfonyl chloride, 2-fluorobenzenesulfonyl chloride, difluorobenzenesulfonyl chloride, trifluorobenzenesulfonyl chloride, tetrafluorobenzenesulfonyl chloride, pentafluorobenzenesulfonyl chloride, 4-chlorobenzenesulfonyl chloride, 3-chlorobenzenesulfonyl chloride, 2-chlorobenzenesulfonyl chloride, dichlorobenzenesulfonyl chloride, trichlorobenzenesulfonyl chloride, 4-bromobenzenesulfonyl chloride, 3-bromobenzenesulfonyl chloride, 2-bromobenzenesulfonyl chloride, dibromobenzenesulfonyl chloride, 4-nitrobenzensulfonyl chloride, and 3-nitrobenzenesulfonyl chloride. Two or more kinds of them may be used. A sulfonyl fluoride compound may be used in place of these sulfonyl chloride compounds.

Representative examples of a bissulfonyl chloride compound used in preparing a compound [21] include 1,4-benzenedisulfonyl chloride, 1,3-benzenedisulfonyl chloride, 1,2-benzenedisulfonyl chloride, 4,4'-biphenyldisulfonyl chloride, and naphthalenedisulfonyl chloride. Two or more kinds of them may be used. A bissulfonyl fluoride compound may be used in place of these bissulfonyl chloride compounds.

Examples of diol compound represented by a compound [22] include ethylene glycol, propylene glycol, butylene glycol, 2,2,3,3,4,4-hexafluoro-1,5-pentanediol, 2,2,3,3,4,4,5,5-octafluoro-1,6-hexanediol, hydroquionone, resorcinol, catechol, 2-methylhydroquinone, 2,6-dimethylhydroquinone, 2-methoxyhydroquinone, 2-phenylhydroquinone, 2,6-diphenylhydroquinone, hydroquinonesulfonic acid, 2-methylresorcinol, 2,4-dimethylresorcinol, 2-phenylresorcinol, 2,4-diphenylresorcinol, 1,2-dihydroxynaphthalene, 1,4-dihydroxynaphthalene, 1,5-dihydroxynaphthalene, 2,6-dihydroxynaphthalene, 2,7-dihydroxynaphthalene, 6,7-dihydroxy-2-naphthalenesulfonic acid, 2,7-dihydroxynaphthalene-3,6-disulfonic acid, 4,5-dihydroxynaphthalene-2,7-disulfonic acid, 4,4'-dihydroxybiphenyl, 4,4'-dihydroxy-3,3'-disulfobiphenyl, 4,4'-dihydroxy-3,3'-diphenylbiphenyl, 2,4'-dihydroxybiphenyl, 2,2'-dihydroxybiphenyl, 4,4'-dihydroxydiphenylmethane, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxyphenyl)-1,1,1,3,3,3-hexafluoropropane, 1,1-bis(4-hydroxyphenyl)-1-phenylethane, bis(4-hydroxyphenyl)diphenylmethane, 9,9-bis(4-hydroxyphenyl)fluorene, 4,4'-dihydroxydiphenyl ether, bis(4-hydroxyphenyl)sulfide, bis(3,5-dimethyl-4-hydroxyphenyl)sulfide, 4,4'-dihydroxybenzophenone, 4,4'-dihydroxydiphenylsulfone, 4,4'-dihydroxy-3,3'-disulfodiphenylsulfone, bis(3,5-dimethyl-4-hydroxyphenyl)sulfone, and an alkali metal salt thereof such as a sodium salt and a potassium salt. Two or more of them may be used.

Among these, ethylene glycol, 2,2,3,3,4,4-hexafluoro-1,5-pentanediol, hydroquinone, hydroquinonesulfonic acid, 4,4'-dihydroxybiphenyl, 2,2-bis(4-hydroxyphenyl)propane, 4,4'-dihydroxy-3,3'-diphenylbiphenyl, 4,4'-dihydroxydiphenyl ether, an alkali metal salt thereof, and others are preferably used since they have high reactivity.

A reaction of polymerizing a compound [21] and an aromatic diol [22] can be performed according to the known method of performing the reaction in the presence of an alkali. As an alkali, the known alkali having polymerization activity can be used. Preferably, alkali metal hydroxide, alkali metal hydride, and alkali metal carbonate etc. are used. Among these, sodium hydride, and potassium carbonate are preferably used.

Although a polymerization reaction may be performed in the molten state without using a solvent, the reaction is preferably performed in a solvent. As a solvent, an aromatic hydrocarbon solvent, an ether solvent, a ketone solvent, an amide solvent, a sulfone solvent, and a sulfoxide solvent can be used, and dimetyl sulfoxide, sulfolane, N,N-dimethylformamide, N,N-dimethylacetamide, N-methylpyrrolidone, N,N'-dimethylimidazolidinone, and diphenylsulfone etc. are preferably used. A reaction temperature of a polymerization reaction is usually 20° C. to 300° C., preferably 50° C. to 200° C.

A number average molecular weight of a precursor of a block having a repeating unit represented by the aforementioned formulas [5] to [8] is preferably 2000 to 500000, more preferably 3000 to 300000, further preferably 5000 to 100000. When a number average molecular weight is smaller than 2000, a membrane strength and heat resistance of a copolymer may be reduced in some cases. When a number average molecular weight is larger than 500000, solubility in a solvent used in a later block copolymerization step or a membrane making step may be reduced in some cases.

The block copolymer of the present invention has at least one block having an acid group and at least one block having substantially no acid group. Examples of a process for preparing the block copolymer include ①̂ a process of chemically binding precursors of these two or more kinds of blocks, and introducing an acid group, and ②̂ process of introducing an acid group into a precursor of a block, and synthesizing a block copolymer. A precursor of a block refers to an oligomer or a polymer corresponding to each block before block copolymerization, which has a reactive site for forming binding of blocks.

A method itself of chemically binding precursors of blocks is not particularly limited, but the known suitable method depending on a combination of respective blocks can be used. Examples of a process for preparing a block copolymer include a process of binding ends of block precursors, a process of binding ends of block precursors via a linking agent, and a method of polymerizing a monomer into a precursor.

For example, when a precursor of a block represented by the general formula [1] and poly(phenylene ethers) which is one example of a precursor of block represented by the general formula [5] are bound, there is a method of condensing poly(phenylene ethers) in which a hydroxy group remains at the end and a precursor of a block represented by the general formula [1] in which a halogeno group remains at an end, in the presence of an alkali. In addition, when poly(phenylene ethers) in which a hydroxy group remains at the end, and a precursor of a block represented by the general formula [1] in which a hydroxy group remains at the end are bound, they may be bound by the similar condensation method using a halogen compound such as 4,4'-difluorobenzophenone and decafluorobiphenyl as a linking agent.

In addition, when a precursor of a block represented by the general formula [1] and poly(phenyl glycidyl ethers) which is one example of a precursor of a block represented by the general formula [6] are bound, an objective compound can be prepared, for example, by converting a precursor of a block represented by the general formula [1] having a hydroxy group at the end into alkali metal phenolate, and performing ring opening polymerization of glycidyl ether containing an aromatic ring using this as a polymerization initiating point.

Alternatively, an objective compound can be also prepared by synthesizing first a precursor of a block in which glycidyl ether containing a group having a halogen atom such as epichlorohydrin, which can be used in a block forming reaction, and phenyl glycidyl ether are copolymerized, and condensing this with a precursor of a block represented by the general formula [1] in which a hydroxy group remains at the end, in the presence of an alkali.

When a precursor of a block represented by the general formula [1], and an epoxy resin which is one example of a precursor of a block represented by the general formula [7] are bound, there is a method of binding a glycidyl group remaining at the end of an epoxy resin to a hydroxy group remaining at the end of a precursor of a block represented by the general formula [1] by ring opening addition.

In addition, when a precursor of a block represented by the general formula [1], and a precursor of a block having a repeating unit represented by the general formula [8] are bound, examples include a method of condensing a precursor of a block represented by the general formula [1] in which a hydroxy group remains at the end, and a precursor of a block having a polymerization unit represented by the general formula [8] in which a group having a halogen atom remains at the end, in the presence of an alkali, and a method of condensing a precursor of a block represented by the general formula [1] in which a group having a halogen atom remains at the end, and a precursor of a block having a polymerization unit represented by the general formula [8] in which a hydroxy group remains at the end, in the presence of an alkali. When a precursor of a block represented by the general formula [1] in which a hydroxyl group remains at the end, and a precursor of a block having a polymerization unit represented by the general formula [8] in which a hydroxy group remains at the end are bound, they may be bound by the similar condensation reaction using a halogen compound such as 4,4'-difluorobenzophenone and decafluorobiphenyl as a linking agent. When a precursor of a block represented by the general formula [1] in which a group having a halogen atom remains at the end, and a precursor of a block having a polymerization unit represented by the general formula [8] in which a group having a halogen atom remains at the end are bound, they may be bound by the similar condensation reaction using a diole compound such as hydroquinone and biphenol as a linking agent.

Although the aforementioned block copolymerization reaction can be performed in the molten state without using a solvent, the reaction is preferably performed in a suitable solvent. Examples of such the solvent include the same solvents as those described above, and am amide solvent and a sulfoxide solvent are preferable due to a high solubility. Herein, examples of an amide solvent include N,N-dimethylformamide, N,N-dimethylacetamide, and N-methylpyrrolidone, and examples of a sulfoxide solvent include dimethyl sulfoxide.

A block copolymerization reaction is performed usually at about 20° C. to 250° C., more preferably at about 50° C. to 200° C.

A number average molecular weight of the block copolymer is preferably 5000 to 1000000, more preferably 10000 to 500000, further preferably 15000 to 300000. When a number average molecular weight is smaller than 5000, a membrane strength and heat resistance of a copolymer may be reduced in some cases. When a number average molecular weight is larger than 1000000, a solubility in a solvent used in a later membrane making step may be reduced in some cases.

In the block copolymer used in the present invention, a block having substantially no acid group is preferably 40 to 95% by weight, further preferably 60 to 90% by weight relative to a total block copolymer. When a block having substantially no acid group is larger than 95% by weight, since an acid equivalent in a block copolymer after introduction of an acid group is small, sufficient performance as a polymer electrolyte may not be obtained in some cases. When an acid equivalent is smaller than 40% by weight, water resistance of a block copolymer after introduction of an acid group may be reduced in some cases.

When the aforementioned ①̂ process is used, a block copolymer having a sulfonic acid group can be prepared by reacting a block copolymer composed of the general formula [1] and the general formulas [5] to [8] with concentrated sulfuric acid. In this case, $R^1$ or Y in the general formula [1] is preferably an electron withdrawing group. In addition, for example, when there is a hydroxyl group, a methyl group and a bromo group in the general formulas [5] to [8], an acid group may be introduced by converting them into a sulfonic acid group, a sulfoalkyloxy group or a phosphonic acid group by an oxidation reaction, a condensation reaction, or the like.

When the ②̂ process is used, there is a method of synthesizing a block composed of the general formula [5], [6], [7] or [8] and, thereafter, introducing an acid group into the block, and binding a block represented by the general formula [1]. Alternatively, there is a method of synthesizing a block composed of the general formula [5], [6], [7] or [8] using a monomer substituted with an acid group, and binding a block represented by the general formula [1].

A block obtained by the above process, or a block precursor can be identified by the known method such as 'HNMR,' $^3$CNMR and IR, and a molecular weight thereof can be determined by a GPC method. Identification may be performed after formation of a block copolymer, but preferably, identification is performed before formation of a block copolymer.

An ion exchange capacity (mole number of acid group per 1 g of polymer electrolyte) of a block copolymer in the present invention is preferably 0.5 meq/g to 3 meq/g, more preferably 0.8 meq/g to 1.8 meq/g. When an ion exchange capacity is lower than 0.5 meq/g, sufficient ion conductivity may not be obtained, and property as a polymer electrolyte may be reduced in some cases. When an ion exchange capacity is higher than 3 meq/g, water resistance may be reduced in some cases.

Thus, the block copolymer of the present invention is prepared and, when the block copolymer of the present invention is used as an isolation membrane of an electrochemical device such as a lithium cell and a fuel cell, the copolymer is usually used as a form of a membrane. A process for preparing a membrane from the block copolymer of the present invention is not particularly limited, but a process of making a membrane from the solution state (solution casting process) is preferable.

Examples of a solution casting process for making a membrane include a process of dissolving a block copolymer in a suitable solvent, casting the solution on a glass plate or a teflon (registered trademark) plate, and heating, if necessary, under reduced pressure to remove the solvent.

In addition, a process of adding a low-molecular electrolyte and an acid compound, or other polymer electrolyte, and impregnating with a solvent for the purpose of improving ion conductivity is known. In utility of a fuel cell, it is also known that, in order to facilitate water control, an inorganic or organic fine particle is added as a water retaining agent. These known methods can be all applied to the present invention.

In addition, in the present invention, a membrane may be crosslinked by irradiation with an electron beam radiation for the purpose of improving a mechanical strength of a membrane. Further, a method of complexing by impregnating into a porous membrane or sheet (porous membrane), and a method of mixing a fiber or a pulp to reinforce a membrane are known, and all of these known methods can be used as far as it is not against the object of the present invention.

A thickness of a membrane is not particularly limited, but 10 to 200 μm is preferable. In order to obtain a strength of a membrane which stands practical use, larger than 10 μm is preferable. For reducing a membrane resistance, that is, improving electricity generating performance, smaller than 200 μm is preferable. A membrane thickness can be controlled by a solution concentration or a coating thickness on a substrate.

Then, a fuel cell of the present invention will be explained.

The fuel cell of the present invention is obtained by holding a membrane-electrode connected body comprising an anode and a cathode comprising a gas diffusion electrode containing a catalyst, and a polymer electrolyte membrane arranged between an anode and a cathode, between separators comprising an electrically conductive carbon plate on which a groove which is to be a passage for a hydrogen gas, the air or an oxygen gas is formed, and incorporating this into a cell.

The catalyst is not particularly limited as far as it can activate an oxidation and reduction reaction of hydrogen or oxygen, but the known catalysts can be used, and it is preferable to use a platinum fine particle or a platinum alloy fine particle. The fine particle is frequently used by carrying particulate or fibrous carbon such as active carbon and graphite.

Regarding a gas diffusion layer of the gas diffusion electrode, the known materials can be used, but a porous carbon non-woven fabric or a carbon paper is preferable.

The block copolymer of the present invention can be also used as a proton-conducting material which is one component of a catalyst composition constituting a catalyst layer of a solid polymer fuel cell.

EXAMPLES

The present invention will be explained below by way of Examples, but the present invention is not limited to these Examples at all.

The block copolymer was assessed as follows:

A block copolymer was dissolved in N,N-dimethylacetamide (hereinafter, abbreviated as DMAc) to a concentration of 5 to 20% by weight, and the solution was cast on a glass plate for making a membrane, and dried to prepare a membrane. Proton conductivity of the membrane was measured by an alternating method under the conditions of a temperature of 80° C. and a relative humidity of 90%. In addition, as water uptake of a membrane, increase in a membrane weight after immersion of a dried membrane in deionized water at 100° C. for 2 hours was obtained using a weight at drying as a standard.

Example 1

(1) 102 g of 2-phenylphenol was dissolved in 400 ml of chlorobenzene. To this were added 5.74 g of anhydrous cuprous bromide and 4.73 g of benzimidazole, and this was stirred at 50° C. for 7 hours under the oxygen atmosphere. After completion of the reaction, the reaction mixture was poured into methanol containing hydrochloric acid to precipitate a polymer, and this was filtered and dried to obtain 42.5 g of poly(2-phenylphenylene ether).

(2) 20 g of 4,4'-dihydroxydiphenylsulfone and 27.3 g of decafluorobiphenyl were dissolved in 200 ml of DMAc, 11.4 g of potassium carbonate was added, and the mixture was stirred at 80° C. for 4 hours. 43.8 g of poly(oxy-4,4'-octafluorobiphenylileneoxy-1,4-phenylene-sulfonyl-1,4-phenylene) having fluorine at the end was obtained.

(3) 6 g of poly(2-phenylphenylene ether), 14 g of poly(oxy-4,4'-octafluorobiphenylileneoxy-1,4-phenylenesulfonyl-1,4-phenylene), 0.67 g of decafluorobiphenyl, 0.44 g of potassium carbonate, and 100 ml of DMAc were added to a flask under a nitrogen stream, and the mixture was heated and stirred at 80° C. for 5 hours. After completion of the reaction, the reaction solution was added dropwise to a 10% aqueous hydrochloric acid solution, the resulting precipitates were recovered by filtering, washed with methanol, and dried under reduced pressure at 60° C. to obtain 20.2 g of a block copolymer. 20 ml of 98% sulfuric acid was added to 2 g of the resulting block copolymer, and the mixture was stirred at room temperature for 2 days. After addition dropwise to a large amount of ice water, the resulting precipitates were recovered by filtering, washing with ion exchanged water was repeated until the washing solution became neutral, and this was dried under reduced pressure to obtain 2.1 g of a sulfonated block copolymer. An ion exchange capacity of the block copolymer was measured by a titration method and, as a result, it was 1.49 meq/g. Results of evaluation of a block copolymer are shown in Table 1.

Comparative Example 1

To a flask were added 30 g of poly(2-phenylphenylene ether) prepared as described above, 70 g of Sumikaexcel PES5003P (hydroxyl group-terminal polyethersulfone manufactured by Sumitomo Chemical Co., Ltd.), 2.8 g of potassium carbonate, 400 ml of DMAc and 40 ml of toluene under a nitrogen stream, the mixture was heated and stirred, and dehydrated under condition of azeotropy of toluene and water, and toluene was removed by distillation. After cooling to 80° C., 5.68 g of decafluorobiphenyl was added, and the mixture was heated and stirred at 80° C. for 4 hours, and at 100° C. for 2 hours. The reaction solution was added dropwise to a 10% aqueous hydrochloric acid solution, the resulting precipitates were recovered by filtration, washed with methanol, and dried at 60° C. under reduced pressure to obtain 102 g of a block copolymer.

According to the same manner as that of Example 1 except that 100 g of the resulting block copolymer was added to 1000 ml of concentrated sulfuric acid, 108.4 g of a sulfonated block copolymer was obtained. An ion exchange capacity of the block copolymer was 1.67 meq/q. Results of evaluation of a block copolymer are shown in Table 1.

Reference Example 1

Preparation Example of Disulfonylimide

Under room temperature, a solution of 468 g of pentafluorobenzenesulfonyl chloride in acetone was added dropwise to an aqueous solution containing 964 g of ammonium chloride, during which a pH was adjusted to 7 with an aqueous sodium hydroxide solution. The precipitated product was filtered, and recrystallized from toluene to obtain 156 g of pentafluorobenzenesulfonamide as white crystals. A structure was confirmed by $^1$H-NMR, $^{19}$F-NMR and IR.

2-fold mole of NaH was added to a solution of pentafluorobenzenesulfonamide in tetrahydrofuran and an equimolar-pentafluorobenzenesulfonyl chloride was subsequently added slowly to react them at 60° C. The reaction mass was filtered, the filtrate was concentrated, this was dissolved in methanol, and a KOH solution in methanol was added thereto to obtain objective disulfonylimide (hereinafter, abbreviated as BSI) as a potassium salt-type. This was purified by recrystallization from an acetone-methanol mixed solvent.

156 g of pentafluorobenzenesulfonamide was dissolved in 1200 ml of a tetrahydrofuran solution, 27.2 g of NaH (60% in oil) was added, and 173 g of pentafluorobenzenesulfonyl chloride was subsequently added gently to react them at 60° C. for 6 hours. The reaction mass was filtered, the filtrate was concentrated, this was dissolved in methanol, and a solution of KOH in methanol was added thereto to precipitate a potassium salt of objective disulfonylimide (hereinafter, abbreviated as BSI). This was purified by recrystallization from an acetone-methanol mixed solvent to obtain 100 g of BSI as white crystals.

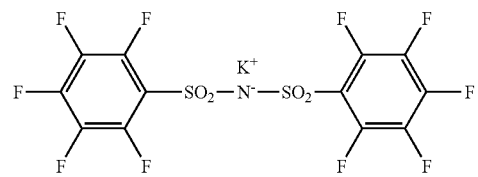

Example 2

To a flask were added 0.5 g of BSI, 0.23 g of a potassium salt of hydroquinonesulfonic acid, 0.16 g of potassium carbonate and 4 ml of dimethyl sulfoxide under a nitrogen stream, and the mixture was heated and stirred at 80° C. for 16 hours. Thereafter, 0.91 g of poly(oxy-4,4'-octafluorobiphenylileneoxy-1,4-phenylene-sulfonyl-1,4-phenylene) prepared in Example 1 was added to react them at 80° C. for 13 hours, and at 100° C. for 20 hours. After completion of the reaction, the reaction solution was added dropwise to a 10% aqueous hydrochloric acid solution, the resulting precipitates were recovered by filtering, washed with methanol, and dried under reduced pressure. A block copolymer was obtained as 1.20 g of a brown solid. An ion exchange capacity of the block copolymer was measured by a titration method and, as a result, it was 1.17 meq/g. Results of evaluation of the block copolymer are shown in table 1.

Comparative Example 2

A mole ratio of 16:15 of 4,4'-dihydroxydiphenylsulfone and 4,4'-dichlorodiphenylsulfone were polycondensed at a temperature of from 200 to 290° C. in a solvent of diphenylsulfone in the presence of potassium carbonate, whereby, hydroxy group-terminal polyethersulfone was synthesized.

To a flask were added 5.15 g of BSI, 1.94 g of a potassium salt of hydroquinonesulfonic acid, 1.59 g of potassium carbonate, and 40 ml of DMSO under a nitrogen stream, and the mixture was heated and stirred at 80° C. for 6 hours. Thereafter, 10.8 g of hydroxy group-terminal polyethersulfone synthesized above was added to react the materials at 80° C. for 10 hours. After completion of the reaction, a polymer was recovered as in Example 2. A block copolymer was obtained as 14.4 g of a brown solid. An ion exchange capacity of the block copolymer was measured by a titration method and, as a result, it was 1.05meq/g. Results of evaluation of the block copolymer are shown in Table 1.

TABLE 1

|  | Proton conductivity (S/cm) | Water uptake (%) |
| --- | --- | --- |
| Example 1 | $1.5 \times 10^{-1}$ | 73 |
| Comparative Example 1 | $1.0 \times 10^{-1}$ | 78 |
| Example 2 | $8.1 \times 10^{-2}$ | 53 |
| Comparative Example 2 | $1.9 \times 10^{-2}$ | 59 |

The block copolymer of the present invention gives a polymer electrolyte membrane which is excellent not only in heat resistance and proton conductivity but also in water resistance and chemical stability, and is useful as an electrolyte for a proton conducting membrane etc. of a fuel cell.

The invention claimed is:
1. A block copolymer characterized in that said block copolymer has at least one block having an acid group and at least one block having substantially no acid group, one end group of a repeating unit in at least one block of all blocks is oxygen and/or sulfur, and at least one repeating unit of a block having substantially no acid group contains a halogen atom.

2. The block copolymer according to claim 1, wherein the repeating unit of a block having substantially no acid group containing a halogen atom is represented by the following general formula [1]:

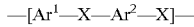  [1]

wherein X represents an oxygen atom or a sulfur atom, and $Ar^1$ and $Ar^2$ represent independently a divalent aromatic group represented by the following formula [2], [3] or [4]:

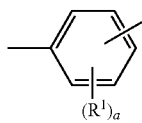  [2]

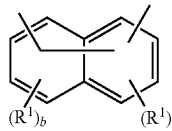  [3]

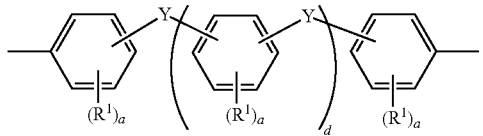  [4]

$R^1$ represents an alkyl group of a carbon number of 1 to 10, a halogenated alkyl group of a carbon number of 1 to 10, a halogenated aryl group, a hydroxyl group, an acetyl group, a benzoyl group, a nitrile group, a nitro group or a halogen atom, when there are a plural of ($R^1$)s, they may be the same as or different from each other, and ($R^1$)s may be bound together so that the bond constitutes a part of a cyclic structure, a, b and c represent independently an integer of 0 to 4, a sum of b and c is 0 to 6, d represents an integer of 0 to 2, Y represents a direct bond, —O—, —S—, —C(O)—, —$SO_2$—, —$C(R^2)_2$—, an alkylene group of a carbon number of 1 to 6, a halogenated alkylene group of a carbon number of 1 to 10, an alkylenedioxy group of a carbon number of 1 to 6, or a halogenated alkylenedioxy group of a carbon number of 1 to 10, when there are a plural of (Y)s, these may be the same or different, any one of $R^1$ and Y (when there are a plural of each $R^1$ and Y, at least one of them) contains a halogen atom, and ($R^2$)s represent an alkyl group of a carbon number of 1 to 10, or a halogenated alkyl group of a carbon number of 1 to 10, two ($R^2$)s may be the same as or different from each other, or may form a ring.

3. The block copolymer according to claim 1, wherein a halogen atom of a block having substantially no acid group containing a halogen atom is a fluorine atom.

4. The block copolymer according to claim 1, wherein the acid group is a sulfonic acid group or a sulfonylimide group.

5. A polymer electrolyte comprising a block copolymer according to claim 1 as an active ingredient.

6. A polymer electrolyte membrane containing a polymer electrolyte according to claim 5.

7. A catalyst composition containing a polymer electrolyte according to claim 5.

8. A fuel cell using a polymer electrolyte membrane according to claim 6.

9. A fuel cell using a catalyst composition according to claim 7.

* * * * *